(12) United States Patent
Glöckl

(10) Patent No.: US 9,265,343 B2
(45) Date of Patent: Feb. 23, 2016

(54) DESK CONFIGURATION

(71) Applicant: AERIS GMBH, Haar (DE)

(72) Inventor: Josef Glöckl, Kirchheim (DE)

(73) Assignee: AERIS GMBH, Haar (DE)

( * ) Notice: Subject to any disclaimer, the term of this patent is extended or adjusted under 35 U.S.C. 154(b) by 0 days.

(21) Appl. No.: 14/360,340

(22) PCT Filed: Oct. 30, 2012

(86) PCT No.: PCT/EP2012/071521
§ 371 (c)(1),
(2) Date: May 23, 2014

(87) PCT Pub. No.: WO2013/104444
PCT Pub. Date: Jul. 18, 2013

(65) Prior Publication Data
US 2015/0230602 A1    Aug. 20, 2015

(30) Foreign Application Priority Data

Jan. 9, 2012 (DE) .......... 10 2012 000 194
Feb. 1, 2012 (DE) .......... 10 2012 100 847

(51) Int. Cl.
| | |
|---|---|
| A47B 37/00 | (2006.01) |
| A47B 83/00 | (2006.01) |
| A47B 17/00 | (2006.01) |
| A47B 21/02 | (2006.01) |
| A47B 21/04 | (2006.01) |
| A47B 87/00 | (2006.01) |
| A47B 83/02 | (2006.01) |

(Continued)

(52) U.S. Cl.
CPC ............. *A47B 83/001* (2013.01); *A47B 17/00* (2013.01); *A47B 21/02* (2013.01); *A47B 21/04* (2013.01); *A47B 83/02* (2013.01); *A47B 87/002* (2013.01); *G06F 3/1431* (2013.01); *H05K 5/0017* (2013.01); *A47B 2083/025* (2013.01); *A47B 2087/004* (2013.01)

(58) Field of Classification Search
CPC .... A47B 21/00; A47B 21/02; A47B 21/0314; A47B 21/0073; A47B 83/001; A47B 83/04; A47B 87/002; A47B 17/065
USPC ............. 108/64, 50.01, 50.02; 312/196, 280, 312/223.3; 52/36.1
See application file for complete search history.

(56) References Cited

U.S. PATENT DOCUMENTS

| | | | | |
|---|---|---|---|---|
| 3,688,419 | A | * | 9/1972 | Woolman .................. 108/61 |
| 4,852,500 | A | * | 8/1989 | Ryburg et al. ............. 108/105 |
| 4,879,955 | A | * | 11/1989 | Moll et al. .............. 108/50.02 |

(Continued)

FOREIGN PATENT DOCUMENTS

DE    202009011272 U1    4/2010

OTHER PUBLICATIONS

International Search Report dated Feb. 13, 2013 issued in PCT/EP2012/071521.

*Primary Examiner* — Jose V Chen
(74) *Attorney, Agent, or Firm* — Scully Scott Murphy & Presser

(57) ABSTRACT

The specification relates to office furniture. In particular, the specification relates to a desk configuration with a plurality of desktops of different heights, to a method for producing a corresponding desk configuration and to the use of a program element for the desk configuration.

19 Claims, 5 Drawing Sheets

(51) Int. Cl.
*H05K 5/00* (2006.01)
*G06F 3/14* (2006.01)

(56) References Cited

U.S. PATENT DOCUMENTS

| | | | |
|---|---|---|---|
| 5,540,160 A * | 7/1996 | Rea | 108/147 |
| 5,558,418 A * | 9/1996 | Lambright et al. | 312/321.5 |
| 5,651,219 A * | 7/1997 | Baloga et al. | 52/36.1 |
| 5,724,778 A * | 3/1998 | Cornell et al. | 52/239 |
| 5,890,325 A * | 4/1999 | Corcorran et al. | 52/36.1 |
| 5,906,079 A * | 5/1999 | Brickner et al. | 52/239 |
| 5,918,432 A * | 7/1999 | Mahone et al. | 52/36.5 |
| 5,988,076 A * | 11/1999 | Vander Park | 108/50.02 |
| 6,289,825 B1 | 9/2001 | Long | |
| 6,374,548 B1 * | 4/2002 | Ruedinger et al. | 52/36.1 |
| 6,460,470 B1 * | 10/2002 | Scharer et al. | 108/153.1 |
| 6,644,748 B2 * | 11/2003 | Tholkes et al. | 297/423.12 |
| 6,807,776 B2 * | 10/2004 | Girdwood et al. | 52/36.1 |
| 7,357,086 B2 * | 4/2008 | Petrick et al. | 108/50.02 |
| 7,958,683 B2 * | 6/2011 | Abusada et al. | 52/36.1 |
| 8,074,581 B2 * | 12/2011 | Epstein et al. | 108/50.01 |
| 8,087,737 B2 * | 1/2012 | Shoenfeld | 312/223.3 |
| 8,225,723 B2 * | 7/2012 | Nakamura et al. | 108/50.01 |
| 8,783,193 B2 * | 7/2014 | Scharing | 108/50.01 |
| 2001/0003960 A1 * | 6/2001 | Lininger et al. | 108/50.01 |
| 2002/0040668 A1 * | 4/2002 | Pang Chan et al. | 108/157.1 |
| 2003/0213415 A1 * | 11/2003 | Ross et al. | 108/50.02 |
| 2004/0065235 A1 * | 4/2004 | de Oliveira | 108/50.01 |
| 2005/0217540 A1 * | 10/2005 | Novak | 108/50.01 |
| 2008/0040982 A1 * | 2/2008 | Durand et al. | 52/36.1 |
| 2008/0211361 A1 * | 9/2008 | Boxenbaum et al. | 312/196 |
| 2009/0133609 A1 * | 5/2009 | Nethken et al. | 108/50.02 |

* cited by examiner

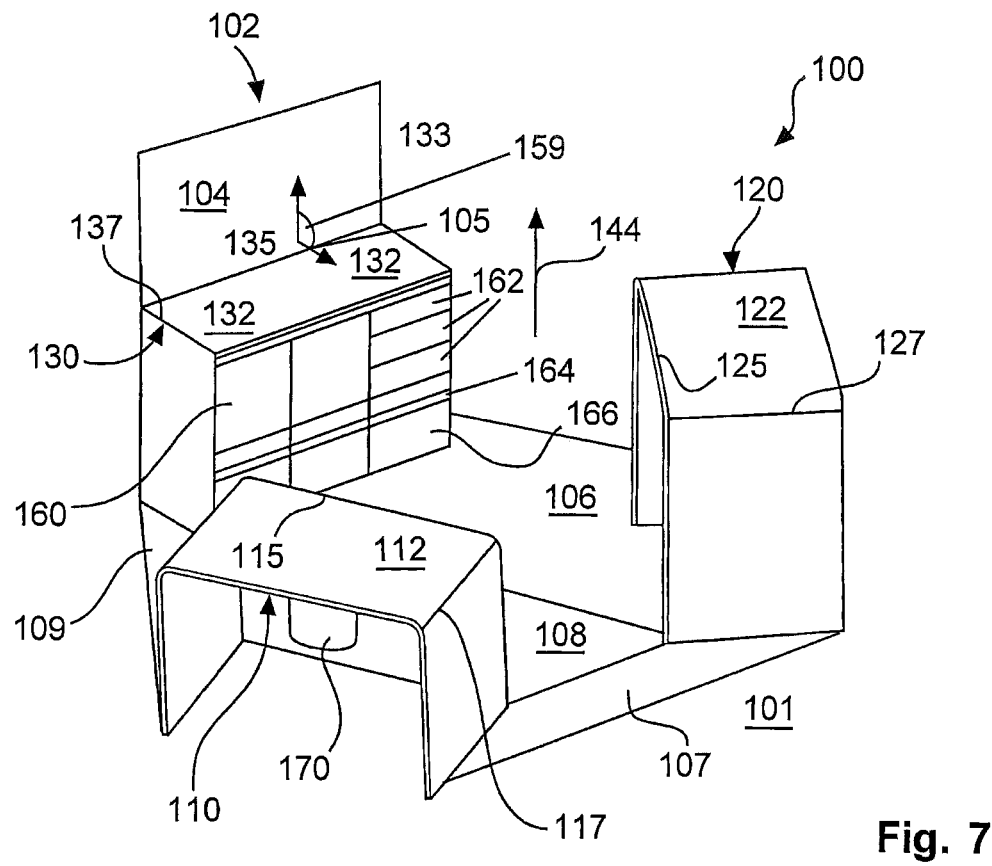
Fig. 7
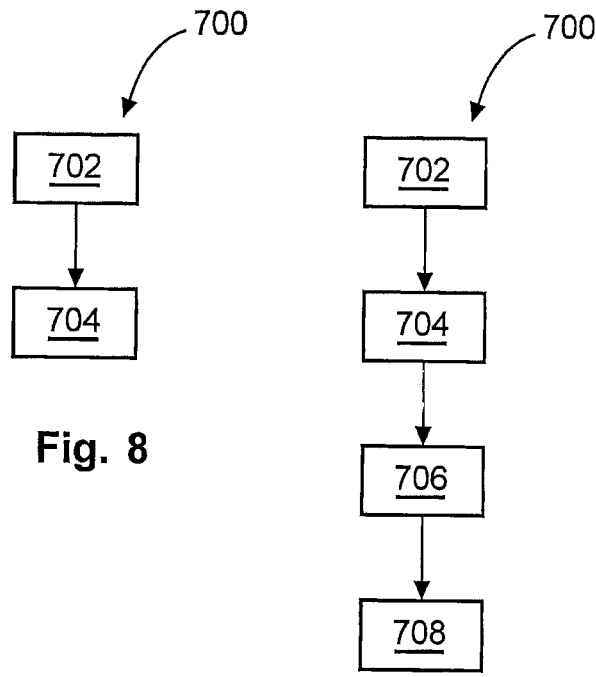
Fig. 8
Fig. 9

DESK CONFIGURATION

The invention relates to office furniture. In particular, the invention relates to a desk configuration with a plurality of desktops of different heights, to a method for producing a corresponding desk configuration and to the use of a program element for the desk configuration.

Sitting at desks in its present form has become the posture of the working population which predominates today, due to the demands of modern companies for more office work and computer work. Working time which the individual spends increasingly at desks requires increased ergonomic measures to prevent tension, pain and long-term damage to the musculoskeletal system in the case of office work or desk work. Sitting for a long time can be harmful to the health, as shown by increasing muscular and skeletal disorders. Likewise, bodily capabilities can be lost, such as condition, muscular strength, reaction speed and responsiveness, and also restricted functions of the immune system and the inner organs of humans which result from sitting for a long time.

In order to keep the human body healthy, there may be a need to keep the body moving more than current conventional sitting can offer. Ergonomic working can serve to increase the efficiency of desk-working, and various measures have already been proposed to make the working environment more flexible and ergonomic, such as ergonomic chairs, in order to improve the sitting posture of the user. Standing desks, at which it is possible to stand and work, for example with books or other documents, are also known.

These measures have contributed to increasing efficiency in office environments, but are incapable of meeting modern requirements with an ever-larger number of actions which take place simultaneously and with increasing office work. Generally during sitting it must be possible to move the joints, ligaments and muscles must be activated during sitting, vessels must not be cut off while sitting, free mobility of the organs relative to the adjoining structures must be provided during sitting, the diaphragm must ensure a maximum possible amount of movement, metabolic activity must be stimulated in the body, and no tension must occur. Complex movements are to be regarded as extremely positive for the human organism, whereas in contrast to this, linear movements are rather detrimental to the organism.

It is known to provide workstations in the form of a "cockpit" solution, in which any superfluous movement is avoided and the time per working step is optimised in order to save time, this type of work possibly reducing working efficiency and wellbeing. A work configuration in which phases of tension and relaxation alternate, and the working position and posture are changed at short intervals, can increase the working efficiency of the user.

It is an object of the present invention to provide means and methods with which the efficiency and flexibility of users in office environments and the ergonomics of the working environment and the flexibility thereof can be improved.

This object is achieved by a desk configuration with a plurality of desktops, and a method for producing such a desk configuration, and the use of a program element for such a desk configuration, according to the independent claims. Developments and configurations of the invention are reproduced in the dependent claims.

According to one aspect of the invention, a desk configuration is devised which is arranged on a floor and has a first desktop at a sitting height of a user in a height range of 60 cm-95 cm from the floor. The first desktop comprises a first work surface which extends in a first longitudinal direction, defined by a first long side which extends in the first longitudinal direction, and by a first transverse side arranged transversely thereto which extends in a first transverse direction.

The desk configuration has a second desktop at a standing height of the user in a height range of 85 cm-130 cm from the floor, which comprises a second work surface which extends in a second longitudinal direction and is defined by a second long side which extends in the second longitudinal direction, and by a second transverse side arranged transversely thereto which extends in a second transverse direction.

The first and second longitudinal directions and the first and second transverse directions are arranged transversely to a vertical direction which extends perpendicularly from the floor. The first desktop and the second desktop are formed separately from each other, and may be individual components arranged separately from each other, with the first and second desktops in the configuration possibly overlapping. The region of overlap may make up less than 10%, 10-20%, 20-30% or 30-50% of the surface area of the first work surface. "Separately" in this context means that the desktops are not structurally joined together, but are arranged independently of each other. The first desktop and the second desktop may be arranged next to each other. A plurality of desk configurations may be provided according to a further aspect of the invention, for example three desk configurations which are arranged at an angle of about 120° to each other.

A first centre point of the first long side is arranged at a first distance in a range of 80 cm to 200 cm from a second centre point of the second long side. The first work surface differs with respect to its size by less than 50% from the second work surface, preferably by less than 10%, or is of the same size as the second work surface. In other words, the first work surface is of equal status to the second work surface, so that a user can perform the same activities on the first work surface as on the second work surface.

An organiser board (OrgaBoard) with a third desktop at the standing height of the user in the height range of 85 cm-130 cm from the floor is provided according to a further embodiment of the desk configuration. The third desktop has a third work surface which extends in a third longitudinal direction, defined by a third long side which extends in the third longitudinal direction and by a third transverse side arranged transversely thereto which extends in a third transverse direction. The third longitudinal direction is arranged transversely to the vertical direction, and the first, second and third desktops are formed separately from each other.

The first long side may be formed arcuate or straight, or have a shape which comprises a combination of arc shape and straight line. The second long side may be formed arcuate or straight, or have a shape which comprises a combination of arc shape and straight line. The third long side may be formed arcuate or straight, or have a shape which comprises a combination of arc shape and straight line.

With such a desk configuration, it is possible for the user to work flexibly, the user being able to realise the movement pattern which he is naturally given during work as well, and to perform complex movements. The user can himself decide how much he moves, and optimally spends the same amount of time at the first desk at sitting height as at the second desktop at standing height, moving in a movement space between the first desktop and the second desktop and the OrgaBoard which is optionally present. In the movement space, the user can partly roll with a seating element, for example if a fixed mat is used as an under-surface in the movement space. A "Swopper" or "Muvman", or alternatively both seating elements, may serve as a seating opportunity, depending on the user's wishes. Preferably a "Swopper" should be used, since this makes it easier to stand up due to its spring and thus promotes constant changing between sitting and standing. The "Muvman" can be used as a "variable seat" in its lowest setting at the seated workstation, and as a standing aid at the standing workstation. Owing to its low weight of only approx. 6 kg and its practical grip, it is easy to adjust.

The first desk can be adapted to the sitting height of the individual user by being able to be adjusted in a height range of 60-95 cm. The second desktop can be set at a standing height of the user by being adjusted in a height range of 85 cm-130 cm. The organiser board with the third desktop can be arranged such that the user can work on the third desktop in a height range of 85 cm-130 cm which suits him, and at the same time can store the office supplies and/or work documents in the organiser board beneath the third desktop, and therefore when retrieving the working material can be forced to bend over or kneel, and thus keep moving.

The desk configuration can be referred to as an "Active Office", the hardware representing the furnishings of the "Active Office" and being able to be adapted flexibly to the user's type of work, preferences and requirements, by adapting for example the surfaces and long sides or transverse sides of the first, second and third desks, just like the standing height of the user and the sitting height of the user. The software is the user's work organisation, which can be determined individually dependent on the work sequences. Each user can himself decide on more or less movement, depending on how much time he wishes to spend at the seat at the first desktop at sitting height and standing at the second desktop at standing height.

In other words, the desk configuration consists of a sitting and standing workstation of equal status, an OrgaBoard and a movement space between the sitting and standing workstation and the OrgaBoard with an active, preferably vertically movable, base ("Active Floor") or a movement space. The movement space gives the user the possibility of moving, he deciding himself how much to move, which depends on the work organisation. A device for measuring the heartbeat of the user can be provided, and also a device for evaluating the heartbeat (heart-rate variability scanner) in order to establish, on the basis of the user's heart rate, a necessary frequency of movement between the first desktop and the second desktop which is adapted for his health. Furthermore, a kinesiometer may be provided in order to draw up a movement profile of a user over a certain time interval such as an 8-hour working day. The movement profile can then be evaluated by means of an evaluation unit and compared with the necessary movement profile or the necessary frequency of movement, in order to draw up a movement plan for the user for the working day with user-specifically defined time intervals at which the user should switch from the first desktop to the second desktop, and vice versa. The evaluation unit may carry out the evaluation or the comparison by means of software.

For many years there have been standing desks which are either fastened directly to the desk or stand independently next to the desk. It is however only seldom that anyone works on them, and if so, then only briefly. Since the work surface on the standing desks is usually small, it has hitherto merely been possible to read something or write something thereon, but not to work on an entire project with extensive documents. In order to persuade a user to work standing up as well, he must be offered the same comfort when standing as when sitting. For this, a work surface of the same size as when sitting, screen, keyboard and mouse are called for at the standing workstation as well. Working must be just as easy as when sitting.

There are also vertically-adjustable desks which are electrically vertically adjustable, these desks usually remaining set to one and the same height by the users. In order to persuade office workers therefore to stand up from sitting comfortably and to work standing or to move about, the work must be organised such that certain activities are automatically carried out while standing. Adjusting the height of the desk interrupts the work and usually takes too long to be able to work through a subject undisturbed, and there are almost always problems with the cabling, the attachment to the adjacent desks and all the often unnecessary utensils which are stationed on the desk, which have to be vertically adjusted too. A desk configuration in accordance with the independent claims of the invention with a sitting and standing workstation of equal status permits working of equal status when sitting and when standing, it being possible for the change from the desk panel at sitting height to the second desk panel at standing height, and vice versa, to take place in less than 1 second, and for a user therefore to be able to continue working without interrupting the same train of thought. The circulation can get going, and the new position can create new ideas and activate the function of the user's immune system due to the movement.

Since it is important when standing to stand actively and dynamically, that is to say constantly to change the load on the legs, a footrest can be used, or a base which is movable in the vertical direction, such as what is called an "Active Floor", which may be movable in the vertical direction, or a balance board, in the movement space in front of the second desk panel at standing height. Standing, in addition to walking and lying, is the most natural form of movement of humans. In order to interrupt relatively long periods of pure standing, the use of a "Muvman" is recommended. This variable seat with its particularly great possibility of vertical adjustment is suitable both as a standing seat and for low sitting. A "Swopper" should be used for the seated workstation, the spring of the "Swopper" promoting easy standing-up, if one swings in and then allows oneself to be pushed upwards by the spring. If one sits down on it again after a period of standing, the "Swopper" swings softly in, and a pleasant feeling may spread through the body. It is possible to sit while moving, since the seat adapts to all movements of the body and thereby avoids the disadvantages of rigid sitting.

No working materials should be put or stacked on the first desk panel and the second desk panel. The organiser board (OrgaBoard) is provided for laying down office supplies and/or work documents. A user works more effectively if the first and second desk panels are empty and the office supplies and/or the work documents are stored in the OrgaBoard than if all the necessary office and working utensils are placed close at hand round his seat in order to save access time, as in a "cockpit". A user only works efficiently when his brain is alert, reacts quickly, avoids errors, and the user feels cheerful and well and derives pleasure from his work. However, a user can only achieve this state when the physiology permits, that is to say a user can achieve this homeostatically only if he moves sufficiently to keep the circulation going and not to allow the blood pressure to drop, to have enough oxygen in the circulation, to pump blood to the brain and to stimulate the micro-circulation.

Standing up or bending over quickly in order for example to retrieve a file from the OrgaBoard and put it back again ultimately increases the efficiency of the user, even if he takes a few tenths of a second longer to do so, since he thus keeps his body and mind fit, instead of allowing it to slacken due to rigid comfortable sitting.

According to a further aspect of the invention, the third long side may have a third centre point which is arranged at a third distance from the second centre point in a range of 15 cm-200 cm. The first centre point can be arranged at a second distance from the third centre point in a range of 80 cm-200 cm.

The first, second and third long sides may have a length in a range of 80 cm-200 cm, whereas the first, second and third transverse sides may have a length in the range of 50 cm-100 cm. Therefore the first desk panel, the second desk panel and the third desk panel may in each case have a surface area in the range of 0.4 m²-2 m². Preferably the first desk panel and the second desk panel in each case have a first and a second long side of a length of 160 cm and a first and a second transverse side of a length of 80 cm, and hence in each case a surface area of 1.28 m². The desk panels may then in each case be inclined about an axis transversely to the vertical direction. The total floor space of the desk configuration may be 8 m². The total floor space comprises the desk configuration, that is to say all the desk panels including movement spaces between the desk panels.

According to a further aspect of the invention, the organiser board can be arranged at least partially beneath the second desktop. This means that a compact desk configuration can be provided and at the same time the movement of the user for example in the direction beneath the second desk panel when putting down or taking out office supplies and/or work documents can be guaranteed by the user. The third desktop of the organiser board and the second desktop may overlap, so that for example 5-25%, 25-50%, 50-75% or 75-100% of the third work surface is overlapped by the second work surface.

According to a further aspect of the invention, the first desk panel and the second desk panel are arranged relative to each other such that a first plane, defined by the first longitudinal direction and the vertical direction, intersects a second plane, defined by the second longitudinal direction and the second vertical direction, so that a first angle which is less than 130° is formed between the first plane and the second plane. The first angle may also have a size of less than or equal to 180°.

According to a further aspect of the invention, a third plane, defined by a third longitudinal direction and the vertical direction, intersects the first plane, so that a second angle which is less than 130° is formed between the first plane and the third plane. Owing to such a configuration of the first desk panel relative to the second desk panel and/or to the OrgaBoard, a compact desk configuration can be ensured while at the same time providing sufficient movement space for a user. The second angle may also have a size of less than or equal to 180°.

The first transverse side may be shorter than the first long side, the second transverse side may be shorter than the second long side, and/or the third transverse side may be shorter than the third long side according to further aspects of the invention.

The first desktop and the second desktop may be arranged relative to each other such that the first long side and the second long side face one another, in order to allow a user to change rapidly or within a short time from the first desktop to the second desktop, for example in a period of less than 1 second.

According to a further aspect of the invention, the first desktop and the third desktop may be arranged relative to each other such that the first long side and the third long side face one another. This means that a compact working configuration can be ensured and at the same time the user can be provided with a sufficient movement space between the first and third desktops.

According to a further aspect of the invention, the second desktop and the third desktop are arranged relative to each other such that the second long side and the third long side face one another, as a result of which a compact working configuration can be provided, and at the same time the possibilities of movement for the user can be ensured.

According to a further aspect of the invention, the organiser board may have a planiform whiteboard which is arranged inclined relative to the third work surface, so that a plane angle which may be arranged in a range of 80°-120° is formed between the whiteboard surface normal and the third surface normal of the third work surface.

According to a further aspect of the invention, the organiser board has at least one storage compartment for depositing office supplies and/or work documents, and/or at least one hanging file, and/or at least one drawer, and/or at least one E-Box, and/or at least one pigeonhole. The at least one storage compartment and/or the at least one hanging file, and/or the at least one drawer, and/or the at least one E-Box, and/or the at least one pigeonhole are arranged beneath the third desktop and extend transversely to the vertical direction.

By providing at least one storage compartment, different materials can be stored in the organiser board and taken out simply and quickly, the user being prompted to bend over and therefore move downwards from the third desktop or second desktop which is arranged at standing height in order to reach the office supplies or the work documents. All the work documents can be accommodated in the OrgaBoard and for example organised according to deadlines, priorities, projects, storage, etc.

According to a further embodiment of the invention, the first desktop and the second desktop are arranged spaced apart in a direction transversely to the vertical direction. Between the first desktop and the second desktop there is arranged on the floor a base which is at least partially movable in the vertical direction.

By providing such a base which is movable in the vertical direction, a user who moves on this base or stands there is constantly prompted mentally and sensorily to process and react to the many stimuli which he receives for example through the floor via the soles of his feet, in order to feel mentally fit and thus to work more efficiently. With the varied, spontaneous, complex movements in the horizontal direction and the stimulation of the soles of the feet of the user by the movable base, a user can remain mentally awake and not become tired, and therefore work more efficiently. The movable base can be referred to as an "Active Floor", and act as a replacement for a "forest floor". Unexpected, varied sensory stimuli, such as are provided by the movable base, require the user's brain and spinal cord to react quickly, which keeps the user mentally awake and physically fit. With the "Active Floor" or the movable base, the user never knows in advance what is to be expected beneath the smooth surface, which is why the user activates his reflexes, integrates afferent and efferent neural pathways, and stimulates the sympathetic nervous system.

In this case, the movable base or the "Active Floor" can be laid out in the entire movement space, apart from around the seated workstation on which the seat, for example the "Swopper", is located. When a "Swopper" with glides is used, it generally stays in its place and the "Active Floor" can start directly next to it and behind the location for the "Swopper" or seat. If a "Swopper" with rollers is used, the "Active Floor" or the movable base can be laid only outside the region of rolling of the Swopper. The movable base may have a flat or smooth surface, with bodies of different sizes and shapes possibly being arranged beneath this surface, in order to provide the above-mentioned stimuli for the soles of the feet of a user.

With such a desk configuration, a user can be enabled to alternate phases of tension and relaxation, to change working position and posture within short distances, and to provide many different sensory stimuli which can stimulate the mind and the soul of the user. Therefore a user can give himself the opportunity, while working with the desk configuration, to keep physically and mentally fit and to arrange the work according to his personal needs. For example, the work can be organised such that the seated work surface, that is to say the first desk panel, and the standing work surface, that is to say the second desk panel, are empty of office supplies and/or work documents and a user can work only on one project or subject at each of the first and second desk panels. After a maximum of 10 minutes, the user can change from the seated work surface to the standing work surface, and vice versa. This changing can be prompted by software on one screen in each case which is arranged at the standing workstation or seated workstation respectively, by indicating on the screen in each case that the workstation should be changed, or by the currently open program or project migrating from one screen to the other.

The user can in principle receive all visitors at the standing work surface and the mobile telephone can be stored in the charging cradle in the OrgaBoard, all telephone conversations can be taken while standing via a landline network with the user's headset, and it is possible to stand dynamically at the standing work surface by using a movable base or "Active Floor". All office utensils and/or work documents can be located in the OrgaBoard, the documents being able to be organised in the OrgaBoard according to priority, deadlines, projects, "To do today", "To read" and to storage. Therefore a user, due to the manner in which he organises his work, can automatically remain in motion, for example by some documents being arranged at the bottom in the OrgaBoard, so that the user has to kneel in order to reach them, and some higher up, so that the user has to stretch to do it. It is made possible to carry out many complex movements automatically. Thus the user is trained, stimulated in different ways and thus kept mentally fit, and can work in an efficient and motivated manner by means of such a desk configuration.

According to a further aspect of the invention, the first desktop and the third desktop are arranged spaced apart in a direction transversely to the vertical direction, and at least partially a base which is movable in the vertical direction is present on the floor between the first desktop and the third desktop.

According to a further aspect of the invention, the second desktop and the third desktop are arranged spaced apart in a direction transversely to the vertical direction, and at least partially a base which is movable in the vertical direction is arranged on the floor between the second desktop and the third desktop.

According to a further aspect of the invention, the first desktop and the second desktop are arranged spaced apart in a direction transversely to the vertical direction, and an at least partially fixed smooth base is arranged on the floor between the first desktop and the second desktop. This means that a smooth base can be devised which is not movable, in order for example to ensure the possibility that a chair for the first desk panel can be moved on the fixed smooth base for sitting and thus it is possible for the user to work flexibly while moving.

According to a further aspect of the invention, the first desktop and the third desktop are arranged spaced apart in a direction transversely to the vertical direction, and at least partially a fixed smooth base is present on the floor between the first desktop and the third desktop.

According to a further embodiment of the invention, the desk configuration has an office chair which is arranged such that it faces the first long side and the second long side. The office chair may for example be a "Swopper", which permits sitting while moving.

According to a further aspect of the invention, the office chair is arranged on a fixed smooth base.

According to a further aspect of the invention, at least one of the second desktop at standing height and the third desktop at standing height has an ergonomic working bay for a user. In this case, the access side of the desktop of the second or third desktop and also of the first desktop may be substantially concave (in a top view) on the respective first, second and third long sides, and the remote side may be substantially convexly or linearly curved. Owing to the concave indentation of the access sides, the ergonomics for the user can be increased, since the reachability of objects on the first, second and third desktops which are configured to be concave in each case can be improved in this manner.

According to a further aspect of the invention, the desk configuration may have a first screen, which is arranged on the first desktop inclined relative to the first work surface, and a second screen, which is arranged on the second desktop inclined relative to the second work surface. Preferably the screens are inclined at an angle of 80°-180° relative to each other. A control unit for controlling the displays of the first screen and of the second screen is provided, wherein the control unit is designed such that at least one set of screen contents which is displayed on the first screen, after a certain user-defined time interval, such as for example 5, 10, 15, 20, 25, 30, 35, 40, 45, 50, 55 or 60 minutes, can be shifted onto the second screen by the control unit, and vice versa, so that the at least one set of screen contents, once the time interval has elapsed, is displayed exclusively on the second screen or on the first screen and a user is prompted, once the time interval has elapsed, to move from the first desktop to the second desktop or from the second desktop to the first desktop in order there to be able to continue to look at the set of screen contents which was previously displayed on the first screen or second screen, on the second screen or first screen. The time interval can be defined by a user himself and switched off if required.

Furthermore, a first set of screen contents of the at least one set of screen contents can be displayed on the first screen, and a second set of screen contents of the at least one first set of screen contents on the second screen. For example, an email program such as "Outlook" can be displayed as a window at the standing workstation, and when a new email is being composed the corresponding email window can be displayed at the seated workstation. This means that the work sequences can be divided into reading activities and work activities, such as for example reading and writing email, so that a user has to move from one screen to the other and thus from the first desk panel at sitting height to the second desk panel at standing height for the respective activity.

Content which is written on the whiteboard by a user can be displayed on the first screen and/or on the second screen. This means that it can be ensured that the contents written on the whiteboard are immediately available to the user in digitised form and thus it is possible to carry on working promptly.

According to a further aspect of the invention, the control unit is arranged at least partially beneath the first desktop. The desk system may have at least one input unit for operating the control unit, the at least one input unit being able to be arranged on the first desktop and/or on the second desktop. The input unit may for example be a keyboard for entering commands or the time intervals after which a set of screen contents is to migrate from the first screen on the first desktop to the second screen on the second desktop, and vice versa.

According to a further aspect of the invention, a method for producing the desk configuration on the floor according to one of the preceding aspects and embodiments is devised. The method comprises arranging the first desktop with the first long side at the sitting height of a user in a height range of 60 cm-95 cm from the floor. A further step is arranging the second desktop with the second long side at the standing height of the user in a height range of 85 cm-130 cm from the floor next to the desktop, such that a first centre point of the first long side is arranged at a first distance in a range of 80 cm-200 cm from a second centre point of the second long side. The first work surface differs with respect to its size by less than 50% from the second work surface. In particular, the first work surface has a surface area of substantially the same size as the second work surface. The first and second work surfaces may have a surface area of about 0.86 m².

The method may furthermore have the step that the first desktop is arranged relative to the second desktop such that a first plane, defined by the first longitudinal direction and the vertical direction, intersects a second plane, defined by the second longitudinal direction and the vertical direction, so that a first angle which is less than 130° is formed between the first plane and the second plane, and a step of arranging the third desktop relative to the first desktop such that a third plane, defined by the third longitudinal direction and the vertical direction, intersects the first plane, so that a second angle which is less than 130° is formed between the first plane and the third plane.

According to a further aspect of the invention, a program element for the desk configuration is devised, wherein the program element, if it is executed by a processor, is suitable for carrying out a method for moving at least one set of screen contents from a first screen to a second screen of a desk configuration according to one of the preceding aspects and embodiments after a certain time interval, and vice versa. The time interval may be for example in the range of 5, 10, 15, 20, 25, 30, 35, 40, 45, 50, 55, 60 minutes. The time interval can be defined by a user himself and switched off if required.

The set of screen contents of the first screen on the first desktop and the set of screen contents of the second screen on the second desktop can be shifted onto a whiteboard of the organiser board, where it is possible to carry on working with Anoto pens. Conversely, content can be shifted from the whiteboard onto the first or second screen. A workstation can thus be freely selected by the user between a workstation on the first desktop (seated workstation), on the second desktop (standing workstation) or a whiteboard of the organiser board.

In other words, a user can freely select whether he works on the set of screen contents on the first desktop, on the second desktop or on the whiteboard. The set of screen contents can be shifted between the first screen, the second screen and the whiteboard, i.e. back and forth between three positions. Visual, acoustic or kinetic signals can invite the user to change position, according to a time interval which can be freely selected by the user, as described above. For example, a Word document can be shifted from the first or second screen onto the whiteboard and worked on further or corrected there with Anoto pens. The visual, acoustic, tactile or kinaesthetic signals can be controlled by means of the control unit and set by one of the input units.

Content can be entered or worked on both on the first and second screens and on the whiteboard. For example, contents which are entered via the whiteboard can be stored on a control unit and are displayed on the first and/or second screen via the control unit. The whiteboard and the first and second screens and the at least one input unit for entering contents for the first and/or second screen can be connected to the control unit wirelessly and/or in wired manner. Contents which are entered on the whiteboard can be stored on a laptop which can be used instead of the screens and corresponding input units.

According to one embodiment of the invention, a user's movement data can be recorded via at least one sensor such as a 3D movement detector between and at the first and second desktop and the organiser board, and transmitted to the control unit. The control unit can determine and evaluate the sequences of movement of the user for example over time from the movement data, for example such that the standing, sitting and walking time is determined over a certain period, such as for example one hour. The above-mentioned signals for inviting the user to change a position can be controlled by the control unit such that a defined movement profile of the user is encouraged by means of the signals. The movement profile with for example predefined standing, sitting and walking times per hour can be drawn up or adapted using the evaluated sequence of movement of the user.

The movement profile can be defined using criteria, which criteria are selected from the group consisting of base data such as age, size, weight, abdominal girth, eating habits of the user, consisting of movement data such as type and extent of movement during work or in leisure time, quantity and type of food and fluid intake, and consisting of blood values and other biomarkers which describe for example the condition of the immune system. The criteria can define a personal "tree of life" of a user, in which certain value variables of the criteria can be defined by the user for example via the at least one input unit in order to set a personal target tree of life of the user. The personal tree of life and the target tree of life can be entered, edited or displayed on the first or second screen and/or on the whiteboard. If the value variables of the criteria of the personal tree of life change positively and/or in the direction of the value variables of the target tree of life, the tree of life can grow or blossom, and can wilt or become smaller if there is a negative change, in order to convey visually to the user whether the user is moving sufficiently at the workstation and/or is eating sufficiently during working time or is drinking enough liquid.

The individual features of the various embodiments can also be combined with each other, as a result of which in part also advantageous effects may occur which go beyond the sum of the individual effects, even if these are not expressly described.

It should be considered in particular that the features described here and below with re-Bard to the configuration can also be implemented in a desk system or in an office-space configuration or an office space.

This and other aspects of the invention will be explained and clarified by the reference to the embodiments by way of example which are described hereafter.

FIG. 7 shows a perspective view of a desk configuration from top right according to a further embodiment of the invention.

FIG. 8 shows a flow diagram of a method for producing a desk configuration according to one embodiment of the invention.

FIG. 9 shows a flow diagram of a method for producing a desk configuration according to a further embodiment of the invention.

Embodiments of the invention are described below with reference to the appended drawings. The representations in the figures are diagrammatic and not to scale. In the following descriptions of the figures, the same reference numerals are used for identical or similar elements.

Figure 1:
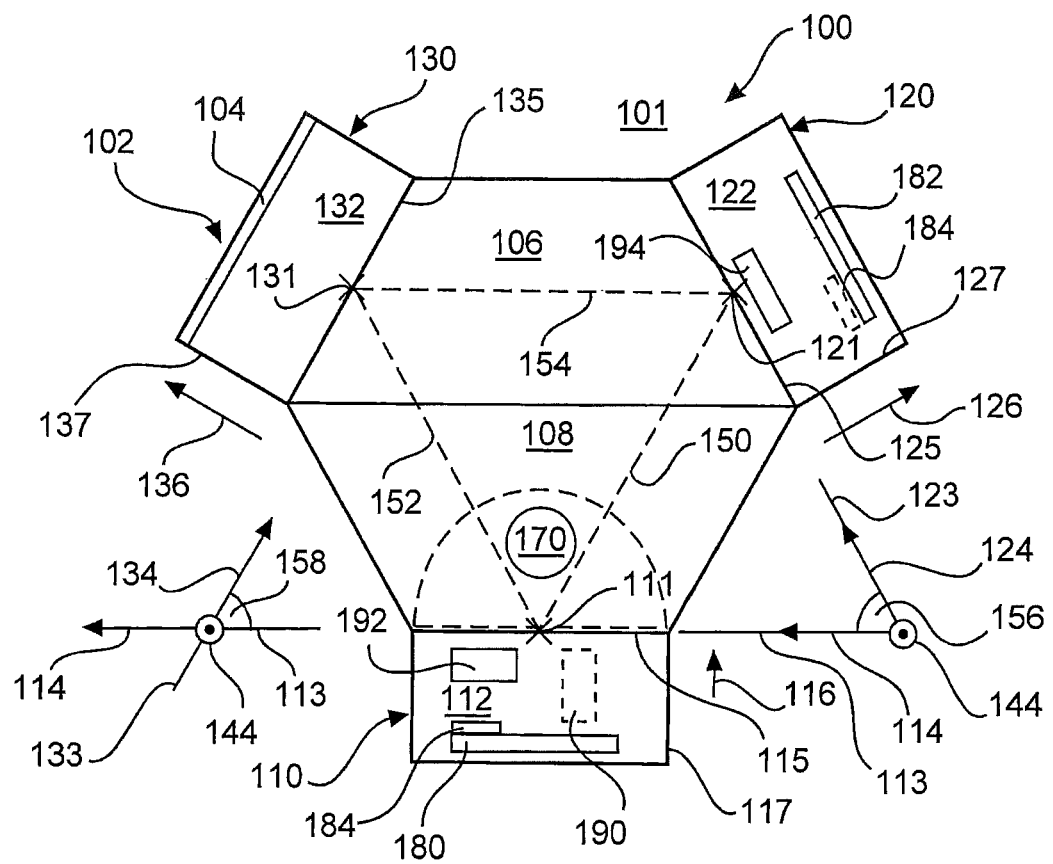
FIG. 1 shows a diagrammatic cross-sectional view of a desk configuration from above according to one embodiment of the invention.

FIG. 1 shows a desk configuration 100 according to an embodiment of the invention, which is arranged on a floor 101. The floor 101 can be formed in planiform manner. A first desktop 110 at a sitting height (not shown, see 140 in FIG. 2) of a user in a height range of 60 cm-95 cm from the floor 101 has a first work surface 112 which extends in a first longitudinal direction 114 and is defined by a first long side 115 in the first longitudinal direction 114 and by a first transverse side 117 arranged transversely thereto in a first transverse direction 116. A second desktop 120 is arranged at a standing height (not shown, see 142 in FIG. 2) of the user in a height range of 85 cm-130 cm from the floor 101, and has a second work surface 122 which extends in a second longitudinal direction 124. The second work surface 122 is defined by a second long side 125 in the second longitudinal direction 124 and by a second transverse side 127 arranged transversely thereto in a second transverse direction 126.

An organiser board 102 or a work organisation means is provided, with a third desktop 130 at the standing height (not shown, see 142 in FIG. 2) of the user in the height range of 85 cm-130 cm from the floor 101. According to one embodiment of the invention, the organiser board 102 is optional. The third desktop 130 has a third work surface 132 which extends in a third longitudinal direction 134 and is defined by a third long side 135 in the third longitudinal direction 134 and by a third transverse side 137 arranged transversely thereto in the third transverse direction 136.

The first, second and third longitudinal directions 114, 124, 134 and the first, second and third transverse directions 116, 126, 136 are arranged transversely to a vertical direction 144 which extends perpendicularly from the floor 101. The first desktop 110, the second desktop 120 and the third desktop 130 are formed separately from each other. In other words, the first desktop 110, the second desktop 120 and the third desktop 130 are components which are separate from each other, which are arranged separately from each other and are joined together merely via the floor 101.

A first centre point 111 of the first long side 115 is arranged at a first distance 150 in a range of 80 cm-200 cm from a second centre point 121 of the second long side 125. The first work surface 112 differs with respect to its size by less than 50% from the second work surface 122. The first and second work surfaces 112, 122 may differ with respect to their size by less than 50%, by less than 40%, by less than 30%, by less than 20%, by less than 10%, by less than 5% and by less than 1%, and preferably have an identical surface size.

The third long side 135 has a third centre point 131 which is arranged at a third distance 154 in a range of 15 cm-200 cm from the second centre point 121. The third centre point 131 is arranged at a second distance 152 in a range of 80 cm-200 cm from the first centre point 111.

The first, second and third long sides 115, 125, 135 may be 80 cm-200 cm long, and the first, second and third transverse sides 116, 126, 136 may have a length of 50 cm-100 cm. The first, second and third work surfaces 112, 122, 132 may have a surface area of 0.4 m$^2$-2 m$^2$.

The organiser board 102 may be at least partially arranged beneath the second desktop 120.

A first plane 113, defined by a first longitudinal direction 114 and the vertical direction 144, intersects a second plane 123, defined by the second longitudinal direction 124 and the vertical direction 144, so that a first angle 156 which is less than 130°, for example 60°, is formed between the first plane 113 and the second plane 123, as shown in FIG. 1. A third plane 133, defined by the third longitudinal direction 134 and the vertical direction 144, intersects the first plane 113, so that a second angle 158 which is less than 130°, for example approx. 60°, is formed between the first plane 113 and the third plane 133, as shown in FIG. 1.

The first transverse side 117 is shorter than the first long side 115, the second transverse side 127 is shorter than the second long side 125, and the third transverse side 137 is shorter than the third long side 135.

The first desktop 110 and the second desktop 120 are arranged relative to each other such that the first long side 115 and the second long side 125 face one another. The first desktop 110 and the third desktop 130 are arranged relative to each other such that the first long side 115 and the third long side 135 face one another. The second desktop 120 and the third desktop 130 are arranged relative to each other such that the second long side 125 and the third long side 135 face one another.

Figure 6:
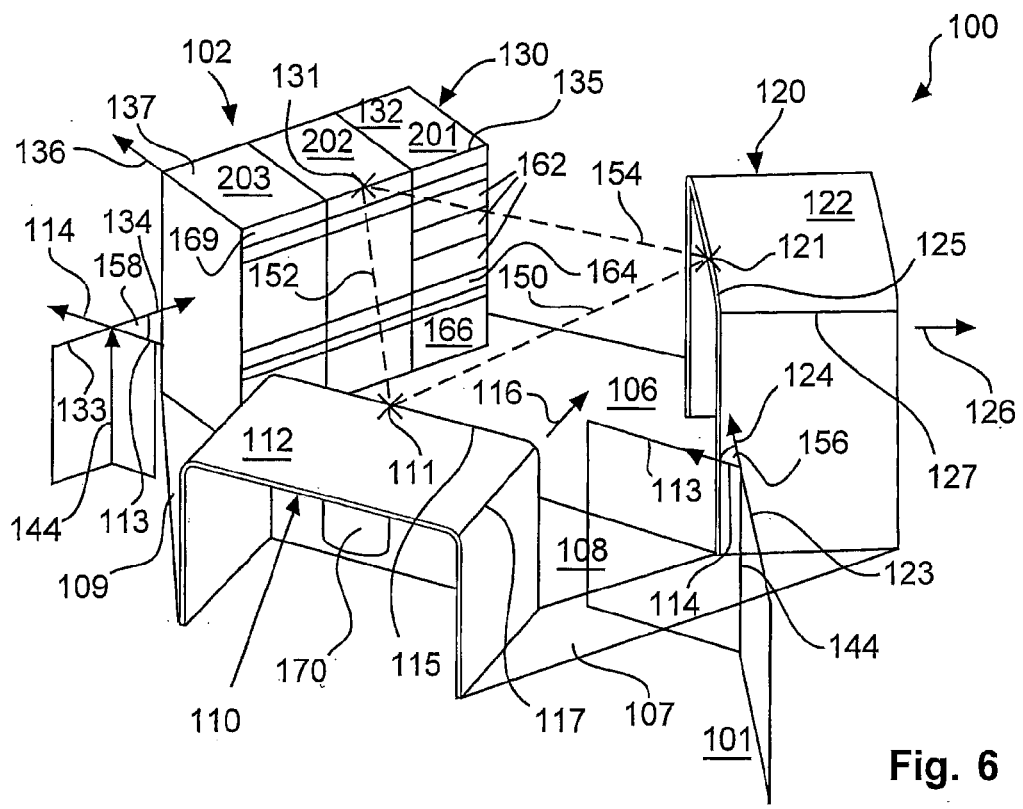
FIG. 6 shows a perspective view of a desk configuration from top right according to a further embodiment of the invention.

The organiser board 102 has a planiform whiteboard 104 which is arranged inclined relative to the third work surface 132, so that a plane angle (not shown, see 159 in FIG. 7) is formed between the whiteboard surface normal (not shown, see 105 in FIG. 7) and the third surface normal (not shown, see 133 in FIG. 7) of the third work surface 132, for example in a range of 80°-120°, preferably 90°. As shown in FIGS. 6 and 7, the organiser board 102 has at least one storage compartment 160 for filing office supplies and/or work documents, the at least one storage compartment 160 being arranged beneath the third desktop 130 and extending transversely to the vertical direction 144. The organiser board 102 may have a plurality of storage compartments of different sizes (not shown, see 160, 162, 164, 166, 169 in FIG. 6), in order to store different office supplies and/or work documents, or office supplies and/or work documents of different degrees of importance, the user being prompted to move, namely to bend over beneath the third desktop 132.

Figure 5:
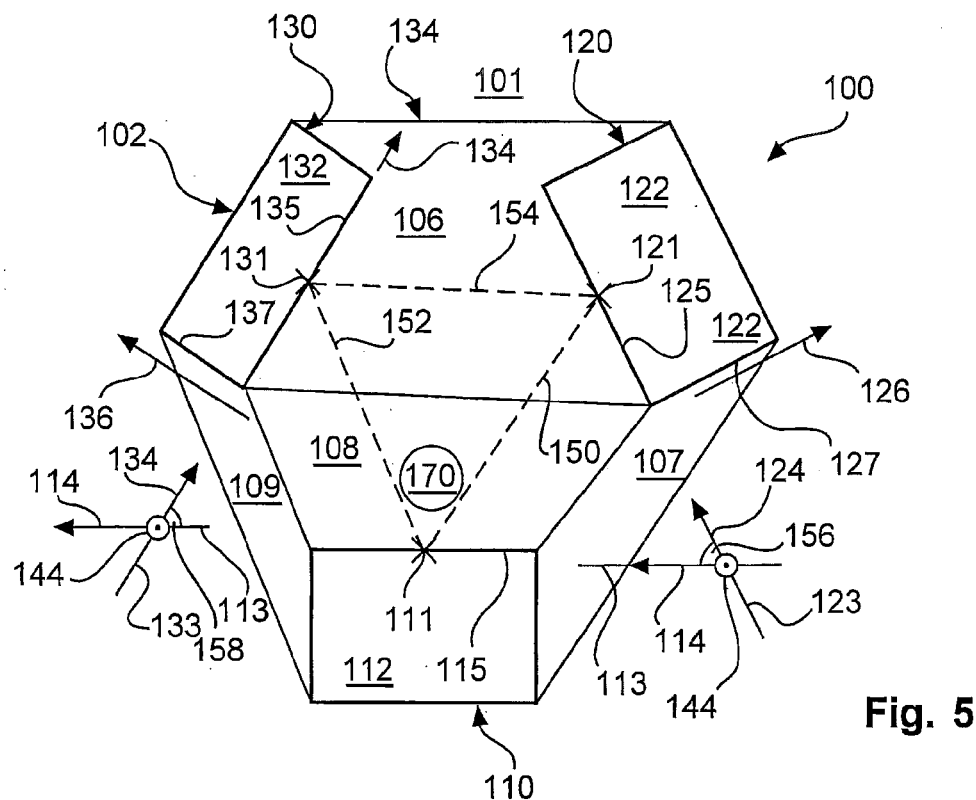
FIG. 5 shows a diagrammatic cross-sectional view of a desk configuration from above according to a further embodiment of the invention.

The first desktop 110 and the second desktop 120 are arranged spaced apart in a direction transversely to the vertical direction 144, with at least partially a base 107 which is movable in the vertical direction 144 possibly being arranged on the floor 101 between the first desktop 110 and the second desktop 120 (not shown, see FIG. 5-7). The first desktop 110 and the third desktop 130 are arranged spaced apart in a direction transversely to the vertical direction 144, and a base 109 which is partially movable in the vertical direction 144 may be arranged on the floor 101 between the first desktop 110 and the third desktop 130 (not shown, see FIG. 5-7). The second desktop 120 and the third desktop 130 are arranged spaced apart in a direction transversely to the vertical direction 144, and a base 106 which is at least partially movable in the vertical direction 144 is arranged on the floor 101 between the second desktop 120 and the third desktop 130.

The movable base 106 is in the form of a trapezium with a long and a short base side and two leg sides, the front points of the second and third long sides 125, 135 representing the long base side of the trapezium and the corresponding, further removed, ends of the long sides 125, 135, the short base side. The leg sides of the trapezium form the second long side 125 and the third long side 135.

The first desktop 110 and the second desktop 120 are spaced apart in a direction transversely to the vertical direction, so that at least partially a fixed, smooth base 108 is arranged on the floor 101 between the first desktop 110 and the second desktop 120, and also between the first desktop 110 and the third desktop 130. An office chair 170 is arranged such that it faces the first long side 115 and the second long side 125 and is arranged on the fixed, smooth base 108. The fixed, smooth base 108 is in the form of a trapezium, the first long side 115 having the short base of the trapezium and the legs of the trapezium being represented by connections of the ends of the first long side 115 to the front ends of the second long side 125 and the third long side 135. The long base of the trapezium is formed by the connection of the front ends of the second and third long sides 125, 135.

The fixed, smooth base 108 according to a special embodiment of the invention may have the shape of a segment of a circle (indicated in FIG. 1 by broken lines), defined by an arc and a chord, the chord possibly lying in the first plane 113 and the arc being convexly curved, so that the smooth base 108 projects into the shape of the movable base 106. The movable base 106 has a shape with a trapezoidal surface section (as illustrated in FIG. 1) and a concave surface section which is formed from the trapezoidal surface of the smooth base 108 according to FIG. 1 minus the convex circular-segment surface of the smooth base of the special embodiment.

At least one of the second desktop 120 and the third desktop 130 at standing height may have ergonomic working bays for the user, so that he can work more easily on the desktops 130 and 120. At the same time, the first, second and third desktops 110, 120, 130 may be inclined about an axis transversely to the vertical direction 144, for example in a range of 2-10°, in order to ensure better working for a user.

A first screen 180 is arranged on the first desktop 110 inclined relative to the first work surface 112, for example at an angle of between 80° and 180°, and preferably at an angle of 90°.

A second screen 182 is arranged on the second desktop 120 inclined relative to the work surface 122, for example at an angle in the range of 80° to 180°, preferably 90°. A control unit 190 for controlling the displays of the first screen 180 and the second screen 182 is designed such that at least one set of screen contents 184 which is displayed on the first screen 180, after a certain user-definable time interval, such as for example a time interval in the range of 5-60 minutes, can be shifted onto the second screen 182 by the control unit 190, and vice versa, so that the at least one set of screen contents 184, once the time interval has elapsed, is displayed exclusively on the second screen 182 or the first screen 180. This prompts a user, once the time interval has elapsed, to move from the first desktop 110 to the second desktop 120 or from the second desktop 120 to the first desktop 110, in order there to be able to continue to look at the set of screen contents 184 which was previously displayed on the first screen 180 or second screen 182, on the second screen 182 or first screen 180.

The control unit 190 is arranged beneath the first desktop 110, and can also be arranged at least partially beneath the first desktop according to a further embodiment. The desk configuration 100 has at least one input unit 192, 194 for operating the control unit, and according to FIG. 1 a first control unit 192 which is arranged on the first desktop 110, and also a second input unit 194 which is arranged on the second desktop 120, the input units 192, 194 also possibly being arranged on the first or second desktop 110, 120, for example in a frame specially produced for this or a storage means.

In order to promote a change of workstation of the user, a first set of screen contents of the at least one set of screen contents 184 may be able to be displayed on the first screen 180 and a second set of screen contents of the at least one set of screen contents 184 on the second screen 182. For example, the main email program "Outlook" can be displayed on the standing workstation, and when composing a new email or upon clicking on the "New Email" icon the window for composing the new email can be displayed on the seated workstation, that is to say on the first desk panel 110 and hence the first screen 180. Thus for example the workstation can be organised such that primarily reading is carried out on the standing workstation, and increasingly typing or writing is carried out on the seated workstation, or the same set of screen contents is worked on both screens.

The content which can be written on the whiteboard 104 by a user can be displayed on the first screen 180 and/or on the second screen 182, as a result of which the text which is written on the whiteboard 104 is immediately available digitally and can be worked on further. All the sets of screen contents 184 can also be worked on the whiteboard 104 and saved back again.

Figure 2:
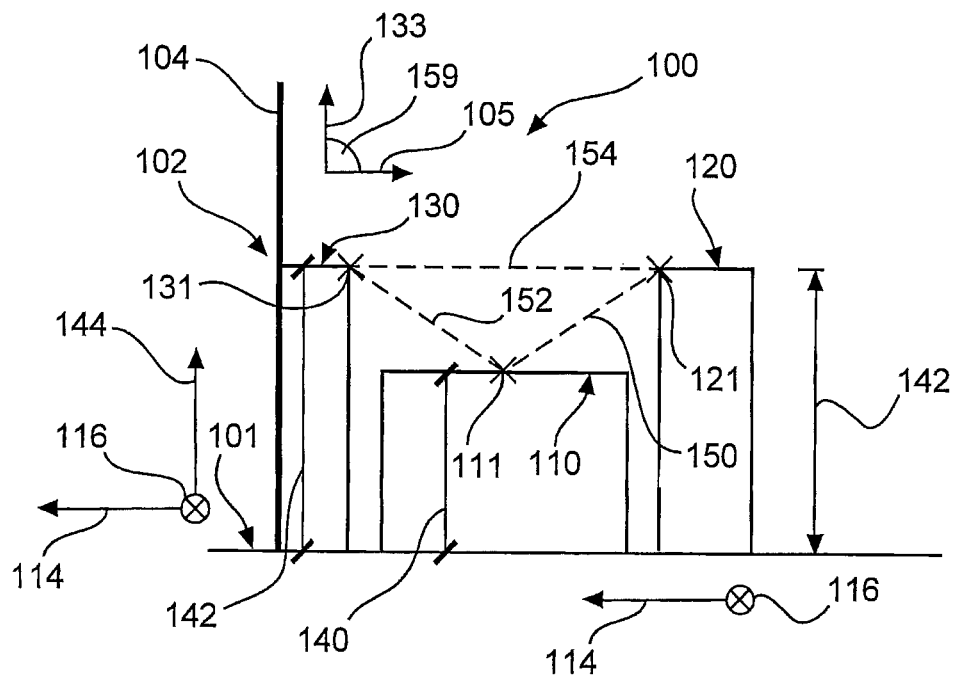
FIG. 2 shows a diagrammatic lateral cross-sectional view of a desk configuration according to a further embodiment of the invention.

FIG. 2 shows a lateral cross-sectional view of the desk configuration according to FIG. 1, the first and second screens and the control unit and the first and second input units with the sets of screen contents not being shown. The first desktop 110 is arranged at the sitting height 140 of a user in a height range of 60 cm-95 cm from the floor 101, and the second desktop 120 and the third desktop 130 is arranged at a standing height 142 of the user in a height range of 85 cm-130 cm from the floor 101.

Figure 3:
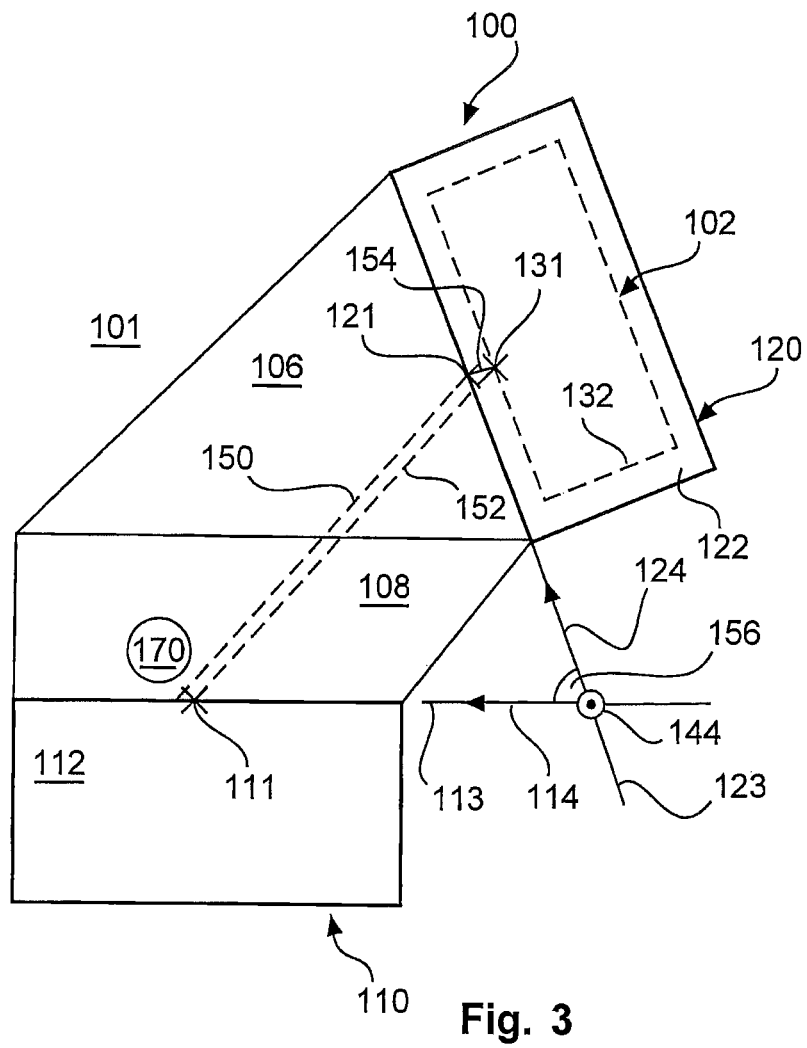
FIG. 3 shows a diagrammatic cross-sectional view of a desk configuration from above according to a further embodiment of the invention.

FIG. 3 shows a diagrammatic cross-sectional view of a workstation configuration 100 according to FIG. 1 from above, with the difference that the organiser board 102 or the work organisation means is arranged beneath the second desktop 120, and the organiser board 102 does not have a whiteboard 104. The first distance 150 in a range of 80 cm-200 cm from the first centre point 111 and the second centre point 121 is similar to the second distance 152 from the first centre point 111 to the third centre point 131 and the third distance 154 between the third centre point 131 and the second centre point 121 is minimal, for example in a range of 5 cm to 20 cm.

Figure 4:
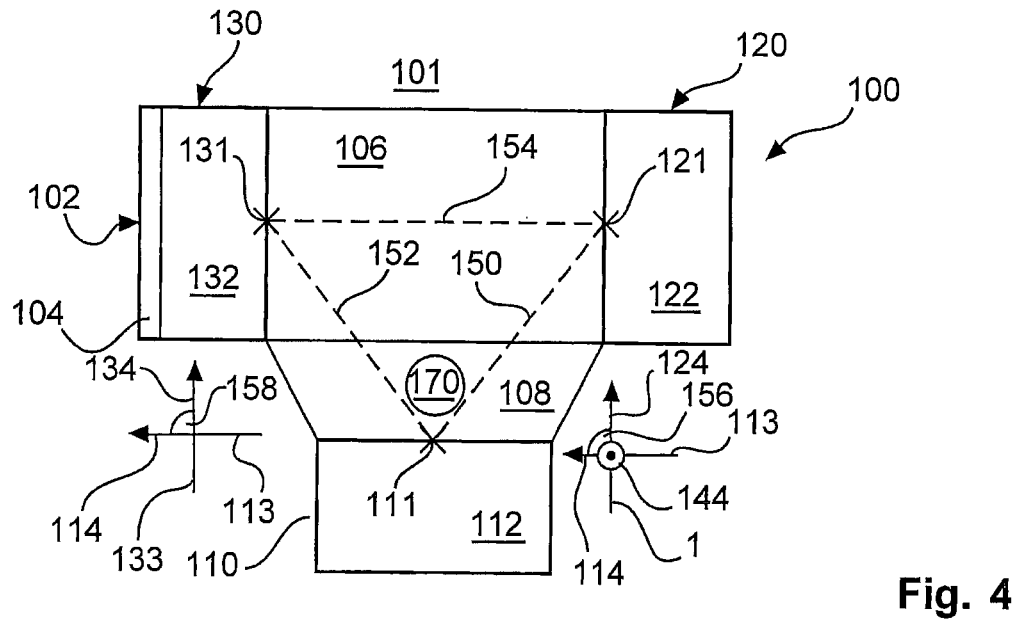
FIG. 4 shows a diagrammatic cross-sectional view of a desk configuration from above according to a further embodiment of the invention.

FIG. 4 shows a diagrammatic cross-sectional view of a desk configuration similar to the desk configuration according to FIG. 1 from above, the screens, the control unit and the input unit not being shown and the first long side 115 not facing the second long side 125 and the third long side 135. The second long side 125 faces the third long side 135. The first plane 113 intersects the second plane 123 at an angle of about 90° and the third plane 133 intersects the first plane 113 likewise at an angle of approx. 90°.

FIG. 5 shows a diagrammatic cross-sectional view of a working configuration according to FIG. 1 from above with the difference that the screens and the input units and the control unit are not shown, and the organiser board 102 does not have a whiteboard. Furthermore, FIG. 5 shows bases 107, 109 which are movable in the vertical direction between the first desktop 110 and the second desktop 120 or the first desktop 110 and the third desktop 130. As already mentioned above, the smooth base 108 may be in the form of a segment of a circle (see FIG. 1, indicated by broken lines).

FIG. 6 shows a diagrammatic perspective view of a desk configuration according to FIG. 5 from top right with a plurality of different storage compartments 160, 162, 164, 166, 169, with first storage compartments 169 being arranged directly beneath the third desktop 130, which are divided into a first lower desktop 201, a second lower desktop 202 and a third lower desktop 203, which are of approximately the same size. Instead of or in addition to the storage compartments 160, 162, 164, 166, 169, the organiser board may have at least one hanging file, at least one drawer, at least one E-Box and/or at least one pigeonhole. Beneath two of the first storage compartments 169 there are arranged two second storage compartments 160 which are of the height of three third storage compartments 162 together, which are arranged beneath the first storage compartment 169 beneath the first lower desktop 201. Beneath the second and third storage compartments 160 and 162 there are arranged in each case fourth storage compartments 164, and thereunder in each case fifth storage compartments 166 which are higher than the fourth storage compartments 164 and lower than the second storage compartments 160. Such a differentiated arrangement of storage compartments in the organiser board makes it possible to file office supplies and/or work documents of different degrees of importance in the organiser board in a structured manner, so that these office supplies and/or work documents can be found and removed quickly if required if a user moves, that is to say bends over downwards from standing height.

FIG. 7 shows a diagrammatic cross-sectional view of a desk configuration 100 according to FIG. 6 from top right, with the difference that the organiser board has a whiteboard 104 which is arranged at an angle of 90° to the third desktop 130 and the third desktop 130 is embodied as a one-piece plate. Between the whiteboard surface normal 105 and the third surface normal 133 of the third work surface 132 there is a plane angle 159 of about 90°, which may likewise be an angle in a range of 80°-120°.

FIG. 8 shows a flow diagram of a method 700 of producing the desk configuration according to one of the preceding aspects and embodiments according to the invention, which has the following steps: arranging 702 the first desktop with the first long side at the sitting height of a user in a height range of 60 cm-95 cm from the floor, and arranging 704 the second desktop with the second long side at the standing height of the user in a height range of 85 cm-130 cm from the floor next to the first desktop, such that a first centre point of the first long side is arranged at a distance in a range of 80 cm-200 cm from a second centre point of the second long side. The first work surface differs with respect to its size by less than 50% from the second work surface.

FIG. 9 shows a further method 700 for producing the desk configuration according to one of the preceding and following aspects or embodiments of the invention, which has the two steps of the method 700 according to FIG. 8 and additionally has the following steps: arranging 706 the first desktop such that a first plane, defined by the first longitudinal direction and the vertical direction, intersects a second plane, defined by the second longitudinal direction and the vertical direction, so that a first angle which is less than 130° is formed between the first plane and the second plane, and arranging the third desktop such that a third plane, defined by the third longitudinal direction and the vertical direction, intersects the first plane, so that a second angle which is less than 130° is formed between the first plane and the third plane.

Figure 10:
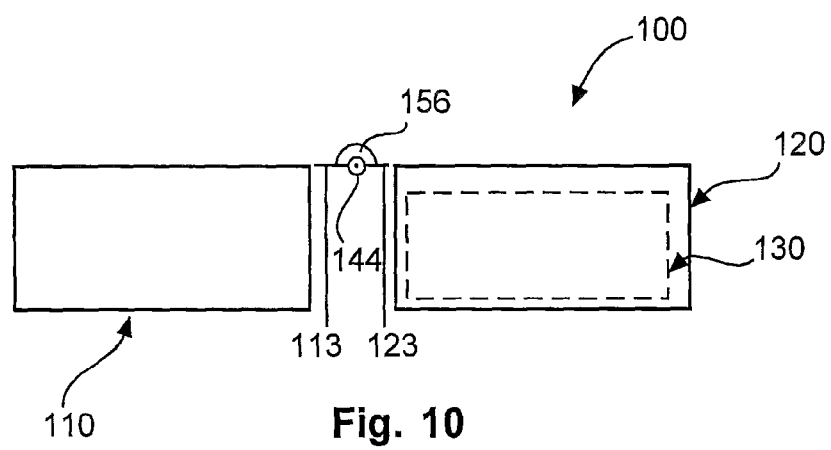
FIG. 10 shows a diagrammatic cross-sectional view of a desk configuration from above according to one embodiment of the invention.

FIG. 10 shows a diagrammatic cross-sectional view of a desk configuration 100 from above, with a first desktop 110 being arranged next to a second desktop 120, so that a first angle 156 of a size of about 180° about a vertical direction 144 is formed between a first plane 113 and a second plane 123. A third desktop 130 of an organiser board is arranged beneath the second desktop 120, similarly to what is shown in FIG. 3, so that a third longitudinal direction of the third desktop 130 is arranged approximately parallel to a second longitudinal direction of the second desktop 120.

Figure 11:
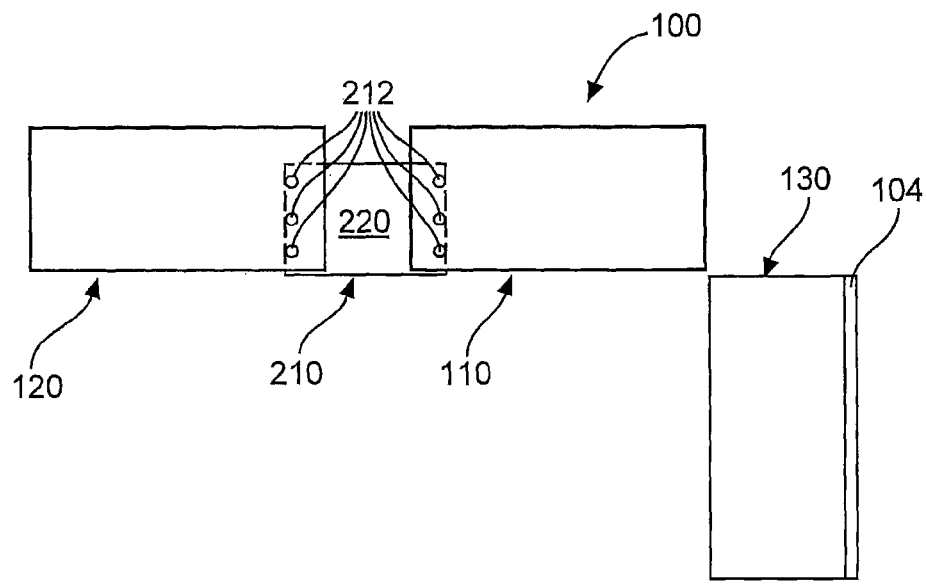
FIG. 11 shows a diagrammatic cross-sectional view of a desk configuration from above according to a further embodiment of the invention.

FIG. 11 shows a diagrammatic cross-sectional view of a desk configuration 100 from above, the first desktop 110 being arranged next to the second desktop 120 and the first desktop 110 being connected to the second desktop 120 by means of a connecting means 210 such as for example a (desk) container via fastening devices 212. In other words, both the first desktop 110 and the second desktop 120 are fastened to the connecting means 210. The connecting means 210 has a storage surface 220 on which for example office supplies or work documents can be laid. An organiser board with a third desktop 130 and a whiteboard 104 is arranged transversely to the first and second desktop 110, 120, preferably approximately orthogonally to the desktops 110, 120, so that a second angle (not designated, see 158 in FIGS. 1 and 6) which is of a size of approx. 90° is formed between a third plane (not designated, see 133 in FIGS. 1 and 6), defined by a third longitudinal direction of the third desktop 130 and a vertical direction, and a first plane of the first desktop (not designated, see 113 in FIG. 10).

Figure 12:
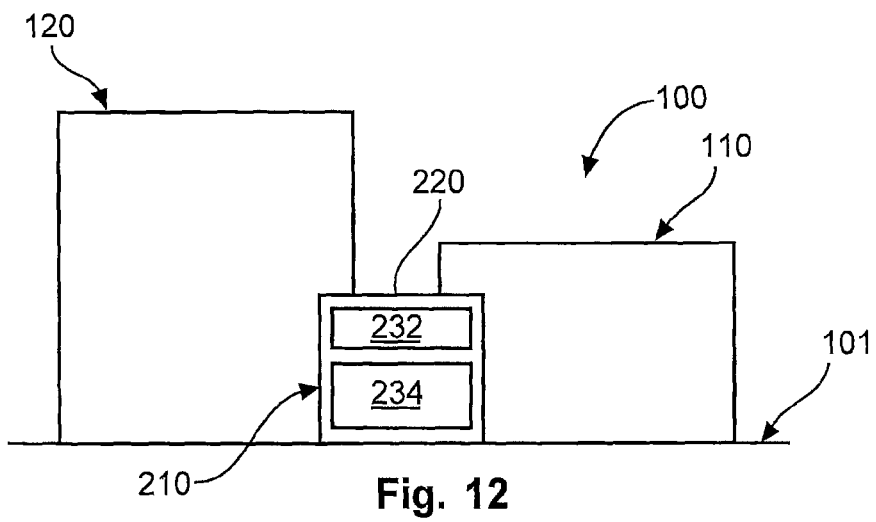
FIG. 12 shows a diagrammatic lateral cross-sectional view of part of the desk configuration of FIG. 11.

FIG. 12 shows a diagrammatic lateral cross-sectional view of the first work surface 110 and the second work surface 120 of the desk configuration 100 of FIG. 11, which are arranged on a floor surface 101 of the desk configuration 100. The connecting means 210 has a first storage compartment 232 and a second storage compartment 234, in which office supplies and/or work documents can be laid. The connecting means 210 may have at least one storage compartment, at least one hanging file, at least one drawer, at least one E-Box and/or at least one pigeonhole, and be formed as a desk container.

Although the invention has been described with reference to the embodiments and aspects, various changes and modifications may be carried out without departing from the scope of the invention. The desk configuration, just like the method for producing the desk configuration, may be embodied in an office building or in an office space or in a desk system.

In addition, it should be pointed out that "comprising" or "having" does not rule out any other elements or steps, and "a" or "one" does not rule out a large number. In particular, the desk configuration may for example therefore have more than one first desktop, more than one second desktop and more than one OrgaBoard, and also more than one office chair, and more than one smooth base and also more than one base which is at least partially vertically movable.

Furthermore, it should be pointed out that features or steps which have been described with reference to one of the above and following embodiments and aspects can also be used in combination with other features or steps of other examples of

The invention claimed is:

1. A desk configuration arranged on a floor, the desk configuration having at least
   a first desktop at a sitting height of a user in a height range of 60 cm to 95 cm from the floor, the first desktop having a first work surface which extends in a first longitudinal direction, defined by a first long side which extends in the first longitudinal direction, and by a first transverse side arranged transversely thereto which extends in a first transverse direction;
   a second desktop at a standing height of the user in a height range of 85 cm to 130 cm from the floor, the second desktop having a second work surface which extends in a second longitudinal direction, defined by a second long side which extends in the second longitudinal direction, and by a second transverse side arranged transversely thereto which extends in a second transverse direction;
   an organiser board with a third desktop at the standing height of the user in the height range of 85 cm to 130 cm from the floor, the third desktop having a third work surface which extends in a third longitudinal direction, defined by a third long side which extends in the third longitudinal direction, and by a third transverse side arranged transversely thereto which extends in a third transverse direction such that the organiser board has a planiform whiteboard which is arranged inclined relative to the third work surface, so that a plane angle in the range of 80° to 120° is formed between the whiteboard surface normal and the third surface normal of the third work surface;
   wherein the first and second longitudinal direction and the first and second transverse direction are arranged transversely to a vertical direction which extends perpendicularly from the floor;
   wherein a first centre point of the first long side is arranged at a first distance in a range of 80 cm to 200 cm from a second centre point of the second long side;
   wherein the first work surface differs with respect to its size by less than 50% from the second work surface;
   wherein the third longitudinal direction is arranged transversely to the vertical direction and a third plane, defined by the third longitudinal direction and the vertical direction, intersects a first plane, defined by the first longitudinal direction and the vertical direction, so that a second angle which is less than 130° is formed between the first plane and the third plane; and
   wherein the first desktop, the second desktop and the third desktop are formed separately from each other.

2. The desk configuration according to claim 1, wherein said organiser board is arranged at least partially beneath the second desktop.

3. The desk configuration according to claim 1, wherein
   a first plane, defined by the first longitudinal direction and the vertical direction, intersects a second plane, defined by the second longitudinal direction and the vertical direction, so that a first angle which is less than 130° is formed between the first plane and the second plane.

4. The desk configuration according to claim 1, wherein the first desktop and the second desktop are arranged relative to each other such that the first long side and the second long side face one another.

5. The desk configuration according to claim 1, wherein the first desktop and the third desktop are arranged relative to each other such that the first long side and the third long side face one another.

6. The desk configuration according to claim 1, wherein the second desktop and the third desktop are arranged relative to each other such that the second long side and the third long side face one another.

7. The desk configuration according to claim 1, wherein the organiser board has at least one storage compartment for depositing work documents and/or office supplies, the at least one storage compartment being arranged beneath the third desktop and extending transversely to the vertical direction.

8. The desk configuration according claim 1, wherein the first desktop and the second desktop are arranged spaced apart in a direction transversely to the vertical direction, and in that at least partially a base which is movable in the vertical direction is arranged on the floor between the first desktop and the second desktop.

9. The desk configuration according to claim 1, wherein the first desktop and the third desktop are arranged spaced apart in a direction transversely to the vertical direction, and in that at least partially a base which is movable in the vertical direction is arranged on the floor between the first desktop and the third desktop.

10. The desk configuration according to claim 1, wherein the second desktop and the third desktop are arranged spaced apart in a direction transversely to the vertical direction, and in that at least partially a base which is movable in the vertical direction is arranged on the floor between the second desktop and the third desktop.

11. The desk configuration according to claim 1, wherein the first desktop and the second desktop are arranged spaced apart in a direction transversely to the vertical direction, and in that at least partially a fixed smooth base is arranged on the floor between the first desktop and the second desktop.

12. The desk configuration according to claim 1, wherein the first desktop and the third desktop are arranged spaced apart in a direction transversely to the vertical direction, and in that at least partially a fixed smooth base is arranged on the floor between the first desktop and the third desktop.

13. The desk configuration according to claim 1, wherein the configuration has an office chair which is arranged such that it faces the first long side and the second long side.

14. The desk configuration according to claim 13, wherein the office chair is arranged on a fixed smooth base arranged on the floor between the first desktop and the second desktop or between the first desktop and the third desktop.

15. The desk configuration according to claim 1, wherein at least one of the second desktop at standing height and the third desktop at standing height has an ergonomic working bay for a user.

16. The desk configuration according to claim 1, wherein the configuration has:
   a first screen, which is arranged on the first desktop inclined relative to the first work surface,
   a second screen, which is arranged on the second desktop inclined relative to the second work surface,
   a control unit for controlling the displays of the first screen and of the second screen;
   the control unit being designed such that at least one set of screen contents which is displayed on the first screen, after a certain user-definable time interval, can be shifted onto the second screen by the control unit, and vice versa, so that this at least one set of screen contents, once the time interval has elapsed, is displayed exclusively on the second screen or on the first screen and a user is prompted, once the time interval has elapsed, to move from the first desktop to the second desktop or from the second desktop to the first desktop in order there to be able to continue to look at the set of screen contents which was previously displayed on the first screen or second screen, on the second screen or first screen.

17. The desk configuration according to claim 16, wherein the control unit is arranged at least partially beneath the first desktop, and in that the desk configuration has at least one input unit for operating the control unit, the at least one input unit being arranged on the first desktop and/or on the second desktop.

18. A program element for the desk configuration according to claim 16, wherein the program element, if it is executed by a processor, is suitable for carrying out a method for moving at least one set of screen contents from a first screen to a second screen of said desk configuration after a certain time interval, and vice versa.

19. A method for producing the desk configuration on the floor according to claim 1, the method having the steps:
- arranging the first desktop with the first long side at the sitting height of a user in a height range of 60 cm to 95 cm from the floor;
- arranging the second desktop with the second long side at the standing height of the user in a height range of 85 cm to 130 cm from the floor next to the first desktop, such that a first centre point of the first long side is arranged at a first distance in a range of 80 cm to 200 cm from a second centre point of the second long side;
- the first work surface differing with respect to its size by less than 50% from the second work surface.

* * * * *